United States Patent
Byun et al.

(10) Patent No.: US 7,586,834 B2
(45) Date of Patent: Sep. 8, 2009

(54) METHOD AND APPARATUS FOR TRANSMITTING UPLINK ACKNOWLEDGEMENT INFORMATION IN AN OFDMA COMMUNICATION SYSTEM

(75) Inventors: Myung-Kwang Byun, Suwon-si (KR); Jae-Ho Jeon, Seongnam-si (KR); Seung-Joo Maeng, Seongnam-si (KR); Jeong-Heon Kim, Anyang-si (KR); Hee-Sang Seo, Seoul (KR); Jeong-Tae Oh, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 793 days.

(21) Appl. No.: 11/141,155

(22) Filed: May 31, 2005

(65) Prior Publication Data

US 2005/0286402 A1 Dec. 29, 2005

(30) Foreign Application Priority Data

May 31, 2004 (KR) ............... 10-2004-0039385

(51) Int. Cl.
*H04J 11/00* (2006.01)
(52) U.S. Cl. .................................... 370/208
(58) Field of Classification Search ............ 370/204, 370/206–210, 203
See application file for complete search history.

(56) References Cited

U.S. PATENT DOCUMENTS

| 6,735,256 B1 * | 5/2004 | Toshimitsu | 375/260 |
| 7,421,011 B2 * | 9/2008 | Pietila et al. | 375/147 |
| 2003/0031121 A1 | 2/2003 | Sudo | |
| 2003/0123383 A1 * | 7/2003 | Korobkov et al. | 370/208 |

FOREIGN PATENT DOCUMENTS

| EP | 1 089 480 | 4/2001 |
| EP | 1 284 554 | 2/2003 |
| JP | 10-107762 | 4/1998 |
| JP | 2001103060 | 4/2001 |
| JP | 2002164864 | 6/2002 |
| JP | 2003283372 | 10/2003 |
| JP | 2005160079 | 6/2005 |

(Continued)

OTHER PUBLICATIONS

Leiba, Yigal et al. Enhancements to fast feedback sub-channel. Apr. 28, 2004, IEEE 802.16 Broadband Wireless Access Working Group. IEEE C802.16d-04/87.*

(Continued)

*Primary Examiner*—Derrick W Ferris
*Assistant Examiner*—Nihar Patel
(74) *Attorney, Agent, or Firm*—The Farrell Law Firm, LLP

(57) ABSTRACT

A method and apparatus for transmitting uplink acknowledge information (ACK) in a communication system using an orthogonal frequency division multiple access (OFDMA) scheme. The method includes receiving a data bit for the uplink ACK; outputting codewords corresponding to the data bit; performing quadrature phase shift keying (QPSK) modulation on symbols for ACK vector indexes corresponding to the codewords for the received data bit; performing inverse fast Fourier transform (IFFT) on a transmission signal having subcarrier clusters to which the modulated transmission symbols are allocated; and transmitting the IFFT-processed transmission signal.

16 Claims, 6 Drawing Sheets

FOREIGN PATENT DOCUMENTS

| | | |
|---|---|---|
| JP | 2005244958 | 9/2005 |
| JP | 2005323382 | 11/2005 |
| JP | 2007500990 | 1/2007 |
| KR | 1020020037627 | 5/2002 |
| KR | 1020030038270 | 5/2003 |
| KR | 1020040036011 | 4/2004 |
| RU | 2142199 | 11/1999 |
| WO | WO 03/096590 | 11/2003 |
| WO | WO 2004/012366 | 2/2004 |
| WO | WO 2004/102980 | 11/2004 |
| WO | WO 2005/015801 | 2/2005 |
| WO | WO 2005/074178 | 8/2005 |

OTHER PUBLICATIONS

Kyunghun Jang et al: "Fast Acknowledgement Method Using Subcarrier Set", Internet Citation, (Online) XP-002221430, Jul. 6, 2001.

* cited by examiner

| VECTOR INDEX | SUBCARRIER MODULATION PER CODEWORD SUBCARRIER 0, SUBCARRIER 1, ... , SUBCARRIER 7 |
| --- | --- |
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

FIG.6

METHOD AND APPARATUS FOR TRANSMITTING UPLINK ACKNOWLEDGEMENT INFORMATION IN AN OFDMA COMMUNICATION SYSTEM

PRIORITY

This application claims priority under 35 U.S.C. § 119 to an application entitled "Method and Apparatus for Transmitting Uplink ACK Information in an OFDMA Communication System" filed in the Korean Intellectual Property Office on May 31, 2004 and assigned Serial No. 2004-39385, the contents of which are incorporated herein by reference.

BACKGROUND OF THE INVENTION

1. Field of the Invention

The present invention relates generally to a method and apparatus for transmitting control information in a mobile communication system, and in particular, to a method and apparatus for transmitting uplink acknowledge (ACK) information in an Orthogonal Frequency Division Multiple Access (OFDMA) communication system.

2. Description of the Related Art

Mobile communication systems are evolving into a $4^{th}$ generation (4G) mobile communication system supporting a super high-speed multimedia service, following a $1^{st}$ generation (1G) analog system, a $2^{nd}$ generation (2G) digital system, and a $3^{rd}$ generation (3G) IMT-2000 system supporting a high-speed multimedia service. In the 4G mobile communication system, a user can access a satellite network, a local area network (LAN), and an Internet network with one terminal. That is, the user is provided with many kinds of services, such as voice, image, multimedia, Internet data, voice mail, and instant message services, with one mobile terminal. More specifically, the 4G mobile communication system provides a data rate of 20 Mbps for a super high-speed multimedia service, and commonly uses an Orthogonal Frequency Division Multiplexing (OFDM) scheme.

The OFDM scheme, which is a digital modulation scheme for multiplexing multiple orthogonal carrier signals, divides a single data stream into several low-speed streams and simultaneously transmits the low-speed streams using several subcarriers with a low data rate.

A multiple access scheme based on the OFDM scheme is known as an Orthogonal Frequency Division Multiple Access (OFDMA) scheme. In the OFDMA scheme, subcarriers in one OFDM symbol are shared by a plurality of users, i.e., subscriber terminals. A communication system based on the OFDMA scheme (hereinafter referred to as an "OFDMA communication system") has separate physical channels for transmitting control information. Uplink control information, which is a type of the control information, includes Channel Quality Indicator (CQI), acknowledge/non-acknowledge (ACK/NAK), Coefficient for Multi-Input Multi-Output (MIMO) system, etc.

FIG. 1 is a diagram illustrating a transmitter for transmitting uplink ACK information in an OFDMA communication system according to the prior art. The uplink ACK information shall be ACK if the corresponding downlink packet has been successfully received; otherwise, it shall be NAK. Referring to FIG. 1, a transmitter 10 includes a binary channel encoder 11, a modulator 12, and an inverse fast Fourier transform (IFFT) block 13.

If there are information data bits for an uplink ACK to be transmitted, the binary channel encoder 11 encodes the information data bits into a codeword using a binary block code, for example, a (20,5) block code.

The modulator 12 includes a coherent modulator or a differential modulator. The modulator 12 determines a transmission symbol corresponding to the codeword output from the binary channel encoder 11 using a coherent or differential modulation scheme, and outputs the transmission symbol to the IFFT block 13. The modulator 12 can use, for example, a Quadrature Phase Shift Keying (QPSK) scheme or a Differential Quadrature Phase Shift Keying (DQPSK) scheme.

The IFFT block 13 performs IFFT on the transmission symbol output from the modulator 12, and transmits the IFFF-processed transmission symbol.

FIG. 2 is a diagram illustrating a receiver for receiving uplink ACK information in an OFDMA communication system according to the prior art. Referring to FIG. 2, a receiver 20 includes a fast Fourier transform (FFT) block 23, a demodulator 22, and a binary channel decoder 21.

Upon receiving a signal transmitted from the transmitter 10, the FFT block 23 performs FFT on the received signal and outputs a received symbol to the demodulator 22. The demodulator 22 includes a coherent demodulator or a differential demodulator. The demodulator 22 receives the received symbol output from the IFFT block 23, and calculates a soft decision value thereof using a demodulation scheme corresponding to the modulation scheme used in the transmitter 10, e.g., coherent demodulation or differential demodulation.

The binary channel decoder 21 receives the soft decision value calculated by the demodulator 22, determines which codeword was transmitted, and outputs data bits corresponding thereto.

The uplink ACK information exchanged between the transmitter 10 and the receiver 20 is not large in the amount for the overall communication services. For example, the ACK information is only one bit. However, because the uplink ACK information is very important information for operation of the communication system, highly reliable transmission should be guaranteed for the uplink ACK information. However, it is common that few frequency-time resources are allocated to physical channels used for transmitting the uplink ACK in order to reduce an overhead rate. Therefore, there is a need for a new transmission method, which is different from the channels to which many resources are allocated, and that transmits a large volume of information, like the traffic channel.

Generally, a combined method of a binary channel code and coherent modulation or differential modulation is used to transmit an uplink ACK channel. The uplink ACK channel is a unit consisting of a number of subcarriers for transmitting the uplink information.

However, when the uplink ACK channel is transmitted using fewer frequency-time resources in this method, an error rate increases, thereby decreasing operation stability of the communication system. That is, whereas sufficient pilot tones for downlink or transmission of uplink traffic area available, there are insufficient traffic tones for transmission of the uplink ACK information. The lack of pilot tones deteriorates channel estimation performance, thereby degrading the performance of a coherent modulation/demodulation scheme. If the number of pilot tones is increased, considering only the channel estimation performance, the number of data tones becomes insufficient.

In addition, separation of the binary channel code and the modulation reduces the optimized performance.

Further, if many frequency-time resources are used for transmission of an uplink ACK information, in order to increase the stability, the overhead rate increases, which reduces throughput of the communication system.

SUMMARY OF THE INVENTION

It is, therefore, an object of the present invention to provide a method and apparatus for efficiently transmitting uplink acknowledge information (ACK) using given frequency-time resources.

It is another object of the present invention to provide a method and apparatus for transmitting uplink ACK using an M-ary channel code and a non-coherent modulation scheme to increase reliability and decrease an overhead rate.

It is further another object of the present invention to provide an uplink ACK transmission method and apparatus for obtaining optimized performance by combining an M-ary channel code with a non-coherent modulation scheme.

According to an aspect of the present invention, there is provided a method for transmitting uplink acknowledge (ACK) information in a communication system using an orthogonal frequency division multiple access (OFDMA) scheme. The method comprises the steps of generating uplink ACK information to be transmitted in consider of downlink packet status; outputting codewords corresponding to the generated uplink ACK information; performing orthogonal modulation on transmission symbols corresponding to the codewords; allocating the orthogonal-modulated transmission symbols to each subcarrier cluster defined in the communication system; and transmitting the allocated subcarrers to uplink.

According to another aspect of the present invention, there is provided a method for transmitting uplink acknowledge (ACK) information in a communication system using an orthogonal frequency division multiple access (OFDMA) scheme. The method comprises the steps of receiving a data bit for the uplink ACK information in consider of downlink packet status; outputting codewords corresponding to the data bit; performing quadrature phase shift keying (QPSK) modulation on symbols for ACK vector indexes corresponding to the codewords for the received data bit;

performing inverse fast Fourier transform (IFFT) on a transmission signal having subcarrier clusters to which the modulated transmission symbols are allocated; and transmitting the IFFT-processed transmission signal.

According to further another aspect of the present invention, there is provided a method for transmitting uplink acknowledge (ACK) information in a communication system using an orthogonal frequency division multiple access (OFDMA) scheme. The method comprises the steps of: generating an ACK signal according to whether an error exists in a downlink packet; selecting an orthogonal modulation pattern corresponding to the generated ACK signal; selecting a transmission symbol corresponding to the selected orthogonal modulation pattern; mapping the transmission symbol to each of predetermined subcarrier clusters; performing inverse fast Fourier transform (IFFT) on each of the subcarrier clusters to which the transmission symbol is mapped; and transmitting the IFFT-processed transmission signal.

According to yet another aspect of the present invention, there is provided a method for receiving uplink acknowledge (ACK) information in a communication system using an orthogonal frequency division multiple access (OFDMA) scheme. The method comprises the steps of performing fast Fourier transform (FFT) on a signal received from a transmitter; calculating a square of an absolute value of a correlation value for a predetermined number of possible patterns, for each of subcarrier clusters of the FFT-processed signal; calculating a sum of squares of absolute values for correlation values of a corresponding pattern for ACK vector indexes, which are a part of a codeword; and determining an information data bit corresponding to an ACK vector index having a maximum value among the calculated values.

According to still another aspect of the present invention, there is provided a method for receiving uplink acknowledge (ACK) information in a communication system using an orthogonal frequency division multiple access (OFDMA) scheme. The method comprises the steps of: receiving a transmission signal from a transmitter; performing fast Fourier transform (FFT) on the received signal; calculating a square of an absolute value of a possible correlation value depending on an ACK signal, for each of subcarrier clusters defined in the communication system; calculating a sum of squares of absolute values for correlation values of the subcarrier clusters for the ACK signal; selecting an ACK signal in which the calculated sum of squares of absolute values is maximized; and determining the selected ACK signal as a signal transmitted from the transmitter.

According to still another aspect of the present invention, there is provided an apparatus for transmitting uplink acknowledge information (ACK) in a communication system using an orthogonal frequency division multiple access (OFDMA) scheme. The apparatus comprises a non-coherent modulator for performing quadrature phase shift keying (QPSK) modulation on symbols for ACK vector indexes corresponding to a codeword for a received data bit, and outputting transmission symbols for a subcarrier; and an inverse fast Fourier transform (IFFT) block for performing IFFT on a transmission signal having subcarrier clusters to which the modulated transmission symbols are allocated, and transmitting the IFFT-processed transmission signal.

According to still another aspect of the present invention, there is provided an apparatus for receiving uplink acknowledge information (ACK) in a communication system using an orthogonal frequency division multiple access (OFDMA) scheme. The apparatus comprises a fast Fourier transform (FFF) for performing FFT on a signal received from a transmitter; a non-coherent demodulator for performing quadrature phase shift keying (QPSK) modulation by calculating a square of an absolute value of a correlation value for a predetermined number of possible patterns, for each of subcarrier clusters of the FFT-processed signal; and a channel decoder for calculating a sum of squares of absolute values for correlation values of a corresponding pattern for ACK vector indexes, which are a part of a codeword, and determining an information data bit corresponding to an ACK vector index having a maximum value among the calculated values.

According to still another aspect of the present invention, there is provided a method for transmitting uplink acknowledge (ACK) information in an orthogonal frequency division multiple access (OFDMA) communication system. The method comprises the steps of: generating an ACK or NAK signal according to whether an error exists or not in a downlink packet; selecting a predetermined modulation pattern composed of a plurality of tile which includes a number of subcarrier corresponding to the generated ACK or NAK signal; selecting transmission symbols corresponding to the selected modulation pattern; and transmitting the selected transmission symbols using an uplink ACK channel.

BRIEF DESCRIPTION OF THE DRAWINGS

The above and other objects, features, and advantages of the present invention will become more apparent from the following detailed description when taken in conjunction with the accompanying drawings in which:

FIG. 6 is a diagram illustrating orthogonal vectors for transmission of uplink ACK information in an OFDMA communication system according to an embodiment of the present invention;

DETAILED DESCRIPTION OF THE PREFERRED EMBODIMENT

Several preferred embodiments of the present invention will now be described in detail herein below with reference to the annexed drawings. In the following description, a detailed description of known functions and configurations incorporated herein has been omitted for conciseness.

A method and apparatus proposed in the present invention uses an M-ary channel code and a non-coherent modulation scheme to increase reliability of transmission of uplink acknowledge (ACK) information, and to reduce an overhead rate. That is, the present invention relates to a method and apparatus for efficiently transmitting uplink ACK information using the M-ary channel code and the non-coherent modulation scheme. The use of the non-coherent modulation/demodulation scheme reduces the use of frequency-time resources. Therefore, it is possible to efficiently transmit uplink ACK channel for which many pilot tones don't have to be allocated. The uplink ACK channel is a unit consisting of a number of subcarriers for transmitting the uplink information.

Unlike the conventional technology in which a binary channel code and a modulation scheme are separated, the present invention acquires a more optimized performance by combining the M-ary channel code with the non-coherent modulation scheme.

As described above, the uplink ACK information used in a communication system is only one bit. The uplink ACK information shall be ACK if the corresponding downlink packet has been successfully received; otherwise, it shall be NAK. However, the uplink ACK information is very important for operation of the communication system. Therefore, the method and apparatus proposed in the present invention uses an orthogonal modulation scheme to transmit the uplink ACK information, and to this end, applies a new modulation pattern.

The present invention proposes the use of a part of a channel quality information (CQI) codeword for transmission of uplink ACK information and to reuse a CQI modulation pattern as the modulation pattern. In addition, the proposed method and apparatus uses Quadrature Phase Shift Keying (QPSK) symbols for transmission symbols. Accordingly, the present invention reduces implementation complexity while maintaining the previous performance.

Figure 1:
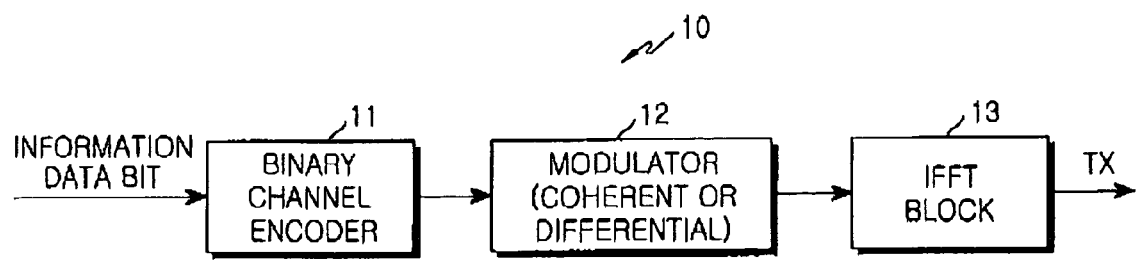
FIG. 1 is a diagram illustrating a transmitter for transmitting uplink ACK information in an OFDMA communication system according to the prior art.
Figure 2:
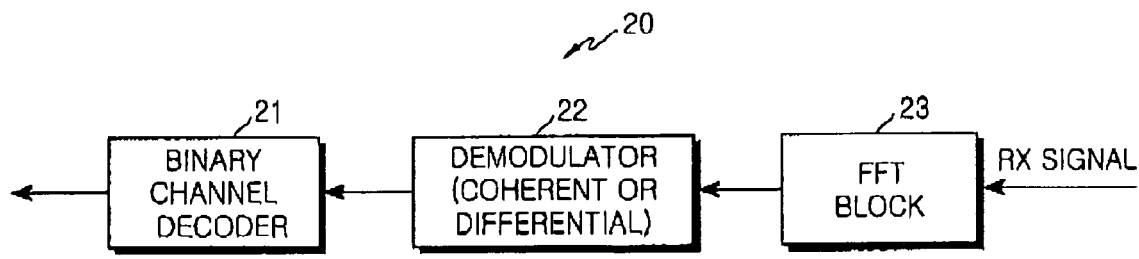
FIG. 2 is a diagram illustrating a receiver for receiving uplink ACK information in an OFDMA communication system according to the prior art.
Figure 3:
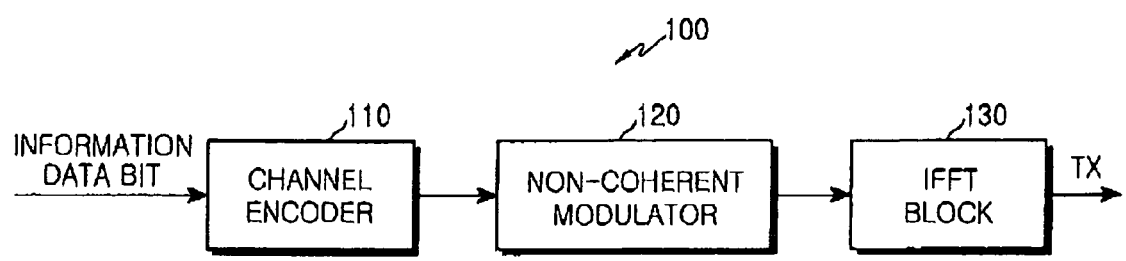
FIG. 3 is a diagram illustrating a transmitter for transmitting uplink ACK information in an OFDMA communication system according to an embodiment of the present invention.

FIG. 3 is a diagram illustrating a transmitter for transmitting uplink ACK in an OFDMA communication system according to an embodiment of the present invention. Referring to FIG. 3, a transmitter 100 includes a channel encoder 110 for encoding information data bits of uplink ACK, a non-coherent modulator 120 for modulating the information data bits using a non-coherent modulation scheme, and an inverse fast Fourier transform (IFFT) block 130 for performing IFFT on a transmission signal before transmission.

If there are information data bits for uplink ACK to be transmitted, the channel encoder 110 encodes the information data bits into a codeword corresponding thereto, and outputs the codeword to the non-coherent modulator 120. The channel encoder 110 can include a binary channel encoder or an M-ary channel encoder that uses M-ary block codes, according to input bits.

The non-coherent modulator 120 determines a transmission symbol corresponding to the codeword output from the channel encoder 110 using the non-coherent modulation scheme, and outputs the transmission symbol to the IFFT block 130. The non-coherent modulator 120 can use, for example, an orthogonal modulation scheme.

The IFFT block 130 performs IFFT on the transmission symbol output from the non-coherent modulator 120, and transmits the IFFT-processed transmission symbol.

Figure 4:
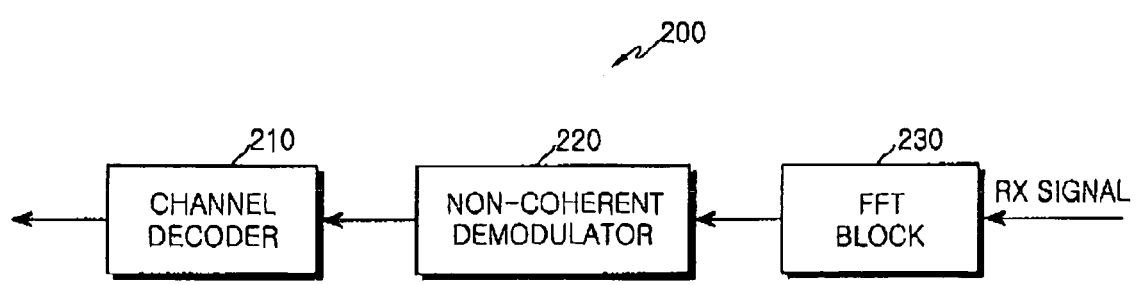
FIG. 4 is a diagram illustrating a receiver for receiving uplink ACK information in an OFDMA communication system according to an embodiment of the present invention.

FIG. 4 is a diagram illustrating a receiver for receiving uplink ACK in an OFDMA communication system according to an embodiment of the present invention. Referring to FIG. 4, a receiver 200 includes a fast Fourier transform (FFF) block 230 for performing FFT on a time-domain received signal to convert the time-domain received signal into a frequency-domain received signal, a non-coherent demodulator 220 for demodulating the frequency-domain received signal, and a channel decoder 210 for decoding data bits for the uplink ACK from the demodulated received symbol.

Upon receiving a received signal from the transmitter 100, the FFT block 230 performs FFT on the received signal and outputs a received symbol to the non-coherent demodulator 220. The non-coherent demodulator 220 receives the received symbol output from the FFT block 230, calculates a soft decision value thereof using a non-coherent demodulation scheme, and outputs the soft decision value to the channel decoder 210. The channel decoder 210 receives the soft decision value from the non-coherent demodulator 220, determines which codeword was transmitted from the transmitter 100, and outputs data bits corresponding thereto. The channel decoder 210 can include a binary channel decoder or an M-ary channel decoder according to input bits.

The new method of transmitting uplink ACK information, proposed in the present invention, will now be described with three pieces of 3×3 subcarrier structure including 9 subcarriers, in frequency-time domains are allocated in an uplink of an OFDMA communication system.

Figure 5:
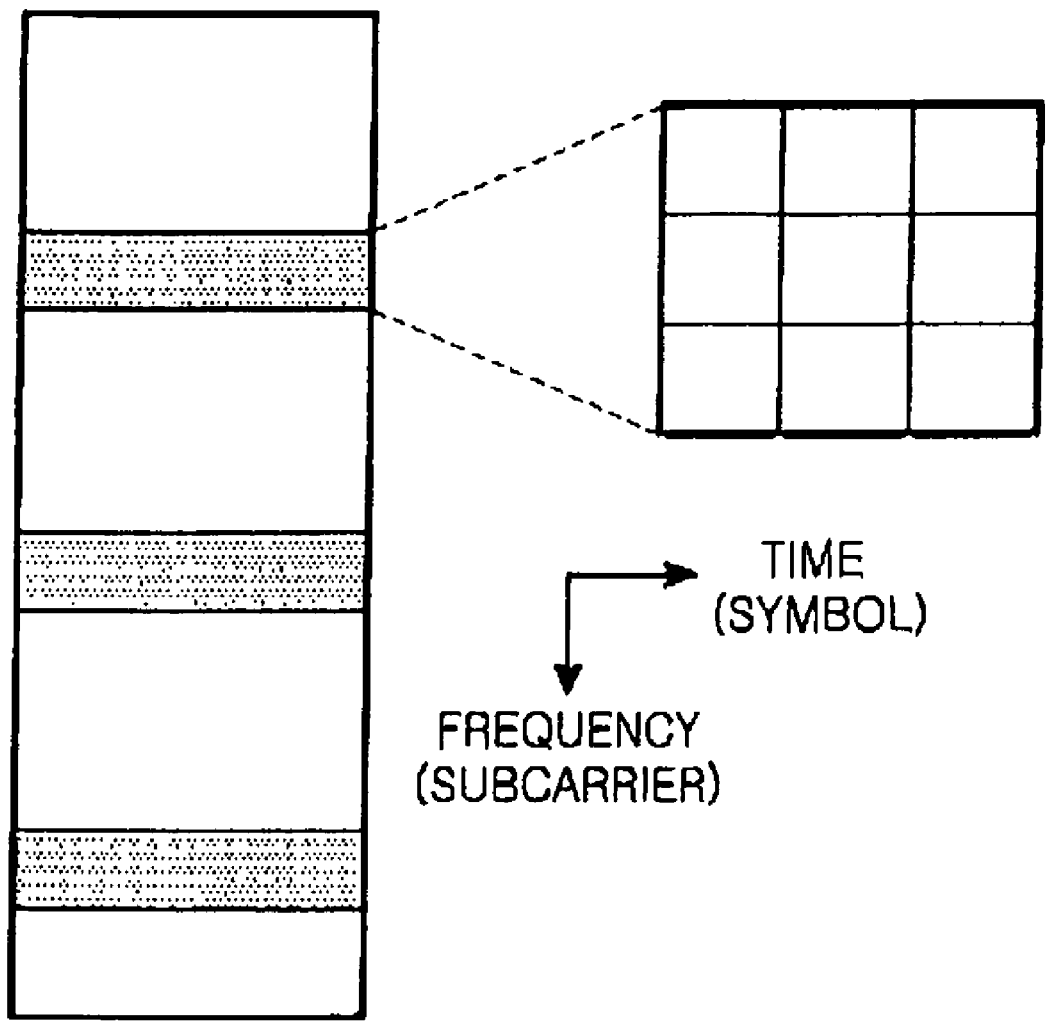
FIG. 5 is a diagram illustrating frequency-time resources allocated for transmission of uplink ACK channel in an OFDMA communication system according to an embodiment of the present invention.

FIG. 5 is a diagram illustrating frequency-time resources allocated for transmitting uplink ACK information depending on a predetermined pattern in an OFDMA communication system according to an embodiment of the present invention. Further, with reference to FIG. 5, a description will first be made of the conventional ACK information transmission method. Thereafter, a description will be made of a new ACK information transmission method according to an embodiment of the present invention. It is assumed herein that the number of information data bits for uplink ACK information is one.

Referring to FIG. 5, an information data bit for uplink ACK information to be transmitted is input to a non-coherent modulator through a binary channel encoder. The non-coherent modulator modulates the transmission signal using an orthogonal modulation scheme. For each of two patterns to be used for the orthogonal modulation, nine values are set as illustrated in Table 1

TABLE 1

| Pattern | Transmission Symbols |
|---|---|
| 0 | 1, 1, 1, 1, $\exp\left(j\frac{2\pi}{3}\right)$, $\exp\left(j\frac{4\pi}{3}\right)$, 1, $\exp\left(j\frac{4\pi}{3}\right)$, $\exp\left(j\frac{2\pi}{3}\right)$ |
| 1 | 1, $\exp\left(j\frac{2\pi}{3}\right)$, $\exp\left(j\frac{4\pi}{3}\right)$, 1, $\exp\left(j\frac{4\pi}{3}\right)$, $\exp\left(j\frac{2\pi}{3}\right)$, 1, 1, 1 |

Table 1 illustrates an example of two orthogonal modulation patterns used in the non-coherent modulator for allocated frequency-time resources when three 3×3 subcarrier clusters in a frequency-time domain are allocated to an ACK channel.

Referring to Table 1, for a pattern '0', transmission symbol values are set as 1, 1, 1, 1, $$\exp\left(j\frac{2\pi}{3}\right), \exp\left(j\frac{4\pi}{3}\right), 1, \exp\left(j\frac{4\pi}{3}\right), \exp\left(j\frac{2\pi}{3}\right),$$

and for a pattern '1', transmission symbol values are set as 1, $$\exp\left(j\frac{2\pi}{3}\right), \exp\left(j\frac{4\pi}{3}\right), 1, \exp\left(j\frac{4\pi}{3}\right), \exp\left(j\frac{2\pi}{3}\right),$$

1, 1, 1. Herein, the transmission symbol values for each of the patterns are previously set as orthogonal values during installation of the communication system. The transmission symbol values can also be set other random values.

Upon receiving one-bit information data for uplink ACK, the non-coherent modulator transmits the information data using a method defined by Equation (1):

$$c_{n,k}^{ACK} = \begin{cases} M_{n,k}^{ACK} & \text{if } k = 0, 1, \ldots, 8 \\ \exp\left(j\frac{2\pi}{3}\right)M_{n,k-9}^{ACK} & \text{if } k = 9, 10, \ldots, 17 \\ \exp\left(j\frac{4\pi}{3}\right)M_{n,k-18}^{ACK} & \text{if } k = 18, 19, \ldots, 26 \end{cases} \quad (1)$$

where $C_{n,k}^{ACK}$ denotes a transmission symbol of a $k^{th}$ subcarrier for an $n^{th}$ ACK channel, $M_{n,k}^{ACK}$ denotes a $k^{th}$ modulation symbol of an $n^{th}$ ACK channel, and n denotes an ACK channel index.

As described above, if there is 1-bit information data to be transmitted, the transmitter 100 transmits the information data for uplink ACK using Equation (1). In Equation (1), transmission symbol values for each pattern are phase-shifted by $$\exp\left(j\frac{2\pi}{3}\right) = \exp(j120°)$$

for k=9 to 17 and by $$\exp\left(j\frac{4\pi}{3}\right) = \exp(j240°)$$

for k=18 to 26, making a $2^{nd}$ subcarrier cluster and a $3^{rd}$ subcarrier cluster, respectively. Optionally, the phase shifts $$\exp\left(j\frac{2\pi}{3}\right) \text{ and } \exp\left(j\frac{4\pi}{3}\right)$$

can be omitted. The phase shifts are taken into consideration for the second and third subcarrier clusters to transmit a more-random pattern in order to make the subcarrier clusters be robust against an interference signal with a specific regular pattern.

In the receiver 200, upon receiving the transmission signal from the transmitter 100, the FFT block 230 performs FFT on the received signal. The non-coherent demodulator 220 calculates a square of an absolute value of a correlation value for the two patterns shown in Table 1, for each of three pieces of 3×3 subcarrier cluster including 9 subcarriers. Thereafter, the channel decoder 210 calculates a sum of squares of absolute values for correlation values of a pattern corresponding to two possible codewords, and then determines that the information data bits corresponding to a codeword having the maximum value among the codewords was transmitted by the transmitter 100.

As described above, the ACK information, which is uplink control information, even though the amount thereof is only 1 bit, is very important information for operation of the communication system. To transmit the ACK information, an orthogonal modulation scheme is used as described above. The orthogonal modulation scheme uses separate modulation patterns shown in Table 1 and uses 3-ary Phase Shift Keying (3-PSK) symbols for transmission symbols. However, such a scheme makes implementation of a transceiver more complex.

When three pieces of 3×3 subcarrier cluster including 9 subcarriers in a frequency-time domain are allocated to an ACK channel as described above, the present invention provides the following definition in order to reduce implementation complexity. That is, an embodiment of the present invention proposes a method of using an ACK vector index, which is a part of a channel quality information (CQI) codeword, for transmission of the ACK information, which is uplink control information, and reusing a CQI modulation pattern as a modulation pattern. Although 3-PSK symbols were used in the forgoing method, QPSK symbols will be used as transmission symbols in the following method.

Referring to FIG. 5, an uplink ACK bit to be transmitted is input to a non-coherent modulator through a channel encoder. The non-coherent modulator modulates transmission symbols for the transmission signal using an orthogonal modulation scheme, and outputs the modulated transmission symbols to an IFFT block. The IFFT block performs IFFT on the modulated transmission symbols and transmits the IFFT-processed transmission symbols.

Two patterns to be used for the orthogonal modulation are shown in Table 2. In addition, ACK vector indexes of the patterns are set using a part of a CQI codeword.

TABLE 2

| ACK bit | ACK vector indices | | |
|---|---|---|---|
| | Tile 0 | Tile 1 | Tile 2 |
| 0 | 0 | 0 | 0 |
| 1 | 4 | 7 | 2 |

As shown in Table 2, a tile 0, a tile 1, and a tile 2 of ACK vector indexes represent three pieces of 3×3 subcarrier cluster including 9 subcarriers. ACK codewords belong to a set of orthogonal vectors and are directly mapped to subcarriers. The orthogonal vectors will be described in more detail later with reference to FIG. 6.

Referring to Table 2, for ACK bit=0, the ACK vector indices of the tile 0, the tile 1 and the tile 2 are all set to '0', and for ACK bit=1, an ACK vector index of the tile 0 is set to 4, an ACK vector index of the tile 1 is set to 7, and an ACK vector index of the tile 2 is set to 2. The orthogonal vectors include QPSK modulation symbols as illustrated in FIG. 6.

FIG. 6 is a diagram illustrating orthogonal vectors for transmitting uplink ACK information in an OFDMA communication system according to an embodiment of the present invention. Referring to FIG. 6, the orthogonal vectors P0, P1, P2, and P3 are QPSK modulation symbols, and can be calculated by Equation (2) below. Because the orthogonal vectors are used even in CQI, the CQI modulation pattern can be reused.

$$P0 = \exp\left(j \cdot \frac{\pi}{4}\right)$$
$$P1 = \exp\left(j \cdot \frac{3\pi}{4}\right)$$
$$P2 = \exp\left(-j \cdot \frac{3\pi}{4}\right)$$
$$P3 = \exp\left(-j \cdot \frac{\pi}{4}\right)$$
(2)

The 8 subcarriers of a 3×3 subcarrier cluster including 9 subcarriers transmit the symbols illustrated in FIG. 6, and the remaining one subcarrier transmits a pilot symbol. The pilot symbol can be arbitrarily selected. Values of the transmission symbols are set as orthogonal vectors for a corresponding vector index as illustrated in FIG. 6.

More specifically, if 1-bit information data (ACK bit) to be transmitted is given, the transmitter 100 transmits the information data for ACK by applying Equation (2). For ACK bit=0, transmission symbol values of the tile 0, the tile 1 and the tile 2 are set as P0, P1, P2, P3, P0, P1, P2, P3 corresponding to a vector index 0. However, for ACK bit=1, transmission symbol vectors of the tile 0 are set as P0, P0, P0, P0, P0, P0, P0, P0 corresponding to a vector index 4, and transmission symbol values of the tile 1 are set as P0, P2, P2, P0, P2, P0, P0, P2 corresponding to a vector index 7. In addition, transmission symbol values of the tile 2 are set as P0, P0, P1, P1, P2, P2, P3, P3 corresponding to a vector index 2.

In the receiver 200, upon receiving the transmission signal from the transmitter 100, the FFT block 230 performs FFT on the received signal. The non-coherent demodulator 220 calculates a square of an absolute value of a correlation value for the two possible patterns shown in Table 2, for each of three pieces of 3×3 subcarrier cluster including 9 subcarriers. Thereafter, the channel decoder 210 calculates a sum of squares of absolute values for correlation values of a pattern corresponding to two possible codewords, and then determines that the information data bit (ACK bit) corresponding to a codeword having the maximum value among the codewords was transmitted by the transmitter 100.

Although the present invention has been described with reference to an example in which an uplink tile has a 3×3 subcarrier structure including 9 subcarriers having one pilot subcarrier and 8 data subcarriers, the present invention is not restricted to the example. For example, in a partial usage subchannel (PUSC), the uplink tile has a 4×3 subcarrier structure including 12 subcarriers having 4 pilot subcarriers and 8 data subcarriers. Unlike the conventional method, the new method according to the present invention can be applied to the latter tile structure.

Figure 7:
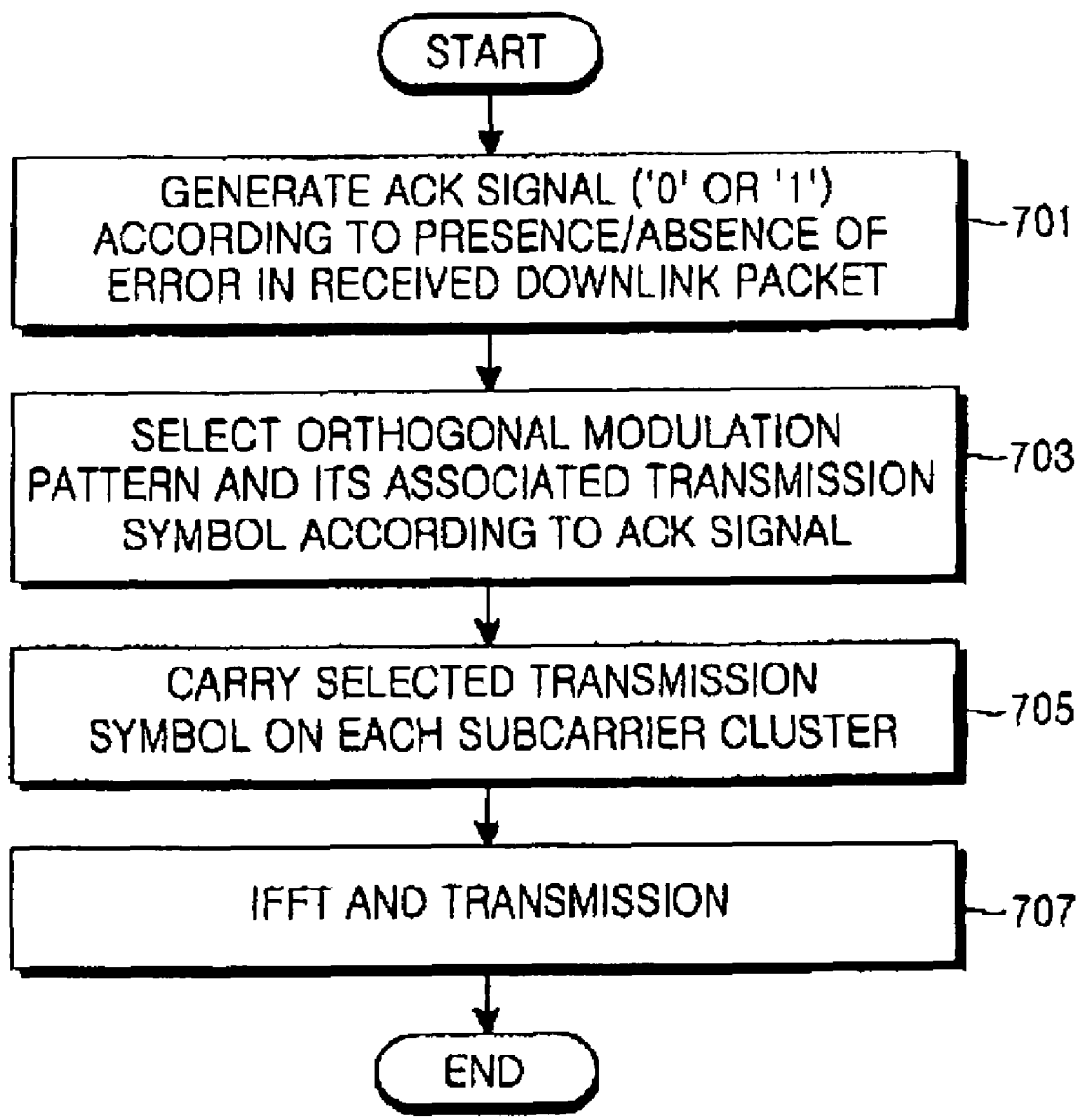
FIG. 7 is a flowchart illustrating an operation of a transmitter for transmitting uplink ACK information in an OFDMA communication system according to an embodiment of the present invention.

FIG. 7 is a flowchart illustrating an operation of a transmitter for transmitting uplink ACK information in an OFDMA communication system according to an embodiment of the present invention. Referring to FIG. 7, in step 701, the transmitter generates an ACK signal indicating presence/absence of an error in a downlink packet, for example, ACK='0' or ACK='1'. In step 703, the transmitter selects an orthogonal modulation pattern depending on the generated ACK signal, and selects transmission symbols corresponding to the selected orthogonal modulation pattern. In step 705, the transmitter maps the selected transmission symbols to each of allocated subcarrier clusters, i.e., each of the three 3×3 subcarrier clusters. In step 707, the transmitter performs IFFT on the subcarrier clusters to each of which the transmission symbols are mapped.

Figure 8:
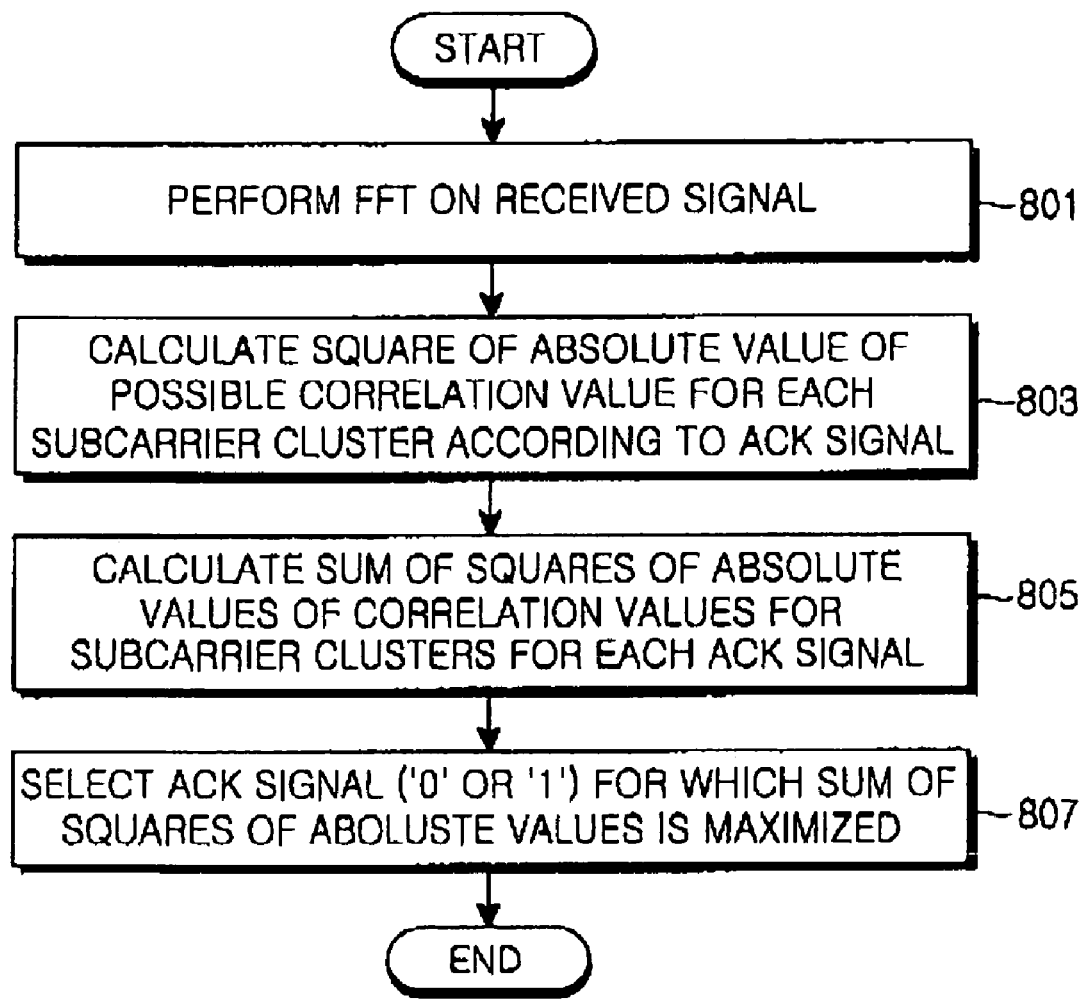
FIG. 8 is a flowchart illustrating an operation of a receiver for receiving uplink ACK information in an OFDMA communication system according to an embodiment of the present invention.

FIG. 8 is a flowchart illustrating an operation of a receiver for receiving uplink ACK information in an OFDMA communication system according to an embodiment of the present invention. Referring to FIG. 8, in step 801, the receiver receives a transmission signal from the transmitter, and performs FFT on the received signal. In step 803, the receiver calculates a square of an absolute value of a possible correlation value according to an ACK signal, for each of three 3×3 subcarrier clusters. In step 805, the receiver calculates a sum of squares of absolute values for correlation values of the subcarrier clusters for each ACK signal. In step 807, the receiver selects an ACK signal in which the calculated sum of square of absolute values is maximized, for example, ACK='0' or ACK='1', and determines that the selected ACK signal was transmitted by the transmitter.

As described in the foregoing description, during transmission of uplink ACK, it is not necessary to create a separate modulation pattern or create 3-PSK symbols for transmission of the uplink ACK, and during reception of the uplink ACK, only a part of a received CQI codeword is used, thereby reducing implementation complexity of the transceiver.

In addition, the present invention can efficiently transmit uplink ACK information using given frequency-time resources. Further, the present invention transmits the uplink ACK information using the conventional resources, thereby maintaining the conventional performance.

In the PUSC defined by the 802.16d D5 standard, an uplink tile has a 4×3 subcarrier structure and includes 4 pilot symbols and 8 data symbols. In this case, unlike the conventional method, the new method can be applied to this tile structure.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for transmitting uplink acknowledge (ACK) information in a communication system using an orthogonal frequency division multiple access (OFDMA) scheme, the method comprising:

generating uplink ACK information to be transmitted in consideration of downlink packet status;

channel-encoding the uplink ACK information into a codeword;

determining modulation symbols corresponding to the codeword by performing orthogonal modulation; and transmitting the modulation symbols allocated to predetermined subcarrier clusters, wherein the modulation symbols are defined by an ACK vector index from:

| ACK bit | ACK vector index | | |
|---|---|---|---|
| | Tile 0 | Tile 1 | Tile 2 |
| 0 | 0 | 0 | 0 |
| 1 | 4 | 7 | 2 | where the ACK bit indicates the uplink ACK information, each of the ACK vector indexes indicates a predetermined set of modulation symbols, and each of the tiles includes a predetermined number of subcarriers.

2. The method of claim 1, wherein each of the ACK vector indexes corresponds to modulation symbols as defined by:

| ACK vector index | Subcarrier Modulation per Codeword Subcarrier 0, Subcarrier 1, . . . , Subcarrier 7 |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 | where P0, P1, P2, and P3 denote the modulation symbols.

3. The method of claim 1, wherein each of the modulation symbols is a quadrature phase shift keying (QPSK) modulation symbol.

4. The method of claim 2, wherein the modulation symbols are calculated by:

$$P0 = \exp\left(j \cdot \frac{\pi}{4}\right)$$

$$P1 = \exp\left(j \cdot \frac{3\pi}{4}\right)$$

$$P2 = \exp\left(-j \cdot \frac{3\pi}{4}\right)$$

$$P3 = \exp\left(-j \cdot \frac{\pi}{4}\right).$$

5. The method of claim 1, wherein the ACK vector indexes are set using a part of channel quality information (CQI) codewords.

6. The method of claim 1, wherein in the subcarrier clusters the modulation symbols are allocated to at least one of subcarriers of predetermined positions, and pilot symbols are allocated to remaining subcarriers.

7. A method for receiving uplink acknowledge (ACK) information in a communication system using an orthogonal frequency division multiple access (OFDMA) scheme, the method comprising:

performing fast Fourier transform (FFT) on a signal received from a transmitter;

outputting modulation symbols allocated to predetermined subcarrier clusters;

calculating a soft decision value corresponding a codeword using the modulation symbols by performing non-coherent demodulation; and determining uplink ACK information corresponding to the codeword by channel-decoding the soft decision value, wherein the modulation symbols are defined by an ACK vector index as follows:

| ACK bit | ACK vector index | | |
|---|---|---|---|
| | Tile 0 | Tile 1 | Tile 2 |
| 0 | 0 | 0 | 0 |
| 1 | 4 | 7 | 2 | where the ACK bit indicates the uplink ACK information, each of the ACK vector indexes indicates a predetermined set of modulation symbols, and each of the tiles includes a predetermined number of subcarriers.

8. The method of claim 7, wherein each of the ACK vector indexes corresponds to the modulation symbols as defined by:

| ACK vector index | Subcarrier Modulation per Codeword Subcarrier 0, Subcarrier 1, . . . , Subcarrier 7 |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 | where P0, P1, P2, and P3 denote Quadrature Phase Shift Keying (QPSK) modulation symbols respectively.

9. The method of claim 7, wherein in the subcarrier clusters, the modulation symbols are allocated to at least one of subcarriers of predetermined positions, and pilot symbols are allocated to remaining subcarriers.

10. An apparatus for transmitting uplink acknowledge (ACK) information in a communication system using an orthogonal frequency division multiple access (OFDMA) scheme, the apparatus comprising:

a channel encoder for channel-encoding uplink ACK information to be transmitted in consideration of downlink packet status, into a codeword corresponding to the uplink ACK information;

a non-coherent modulator for determining modulation symbols corresponding to the codeword; and an inverse fast Fourier transform (IFFT) block for performing IFFT on transmission symbols in order to transmit the transmission symbols allocated to predetermined subcarrier clusters, and transmitting the IFFT-processed transmission signal, wherein the modulation symbols are defined by an ACK vector index as follows:

|         | ACK vector index |        |        |
|---------|--------|--------|--------|
| ACK bit | Tile 0 | Tile 1 | Tile 2 |
| 0       | 0      | 0      | 0      |
| 1       | 4      | 7      | 2      | where the ACK bit indicates the uplink ACK information, each of the ACK vector indexes indicates a predetermined set of transmission symbols, and each of the tiles includes a predetermined number of subcarriers.

11. The apparatus of claim 10, wherein each of the ACK vector indexes corresponds to the modulation symbols as defined by:

| ACK vector index | Subcarrier Modulation per Codeword Subcarrier 0, Subcarrier 1, . . . , Subcarrier 7 |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 | where P0, P1, P2, and P3 denote Quadrature Phase Shift Keying (QPSK) modulation symbols respectively.

12. The apparatus of claim 11, wherein the modulation symbols are as defined by:

$$P0 = \exp\left(j \cdot \frac{\pi}{4}\right)$$

$$P1 = \exp\left(j \cdot \frac{3\pi}{4}\right)$$

$$P2 = \exp\left(-j \cdot \frac{3\pi}{4}\right)$$

$$P3 = \exp\left(-j \cdot \frac{\pi}{4}\right).$$

13. The apparatus of claim 10, wherein, in the subcarrier clusters, the modulation symbols are allocated to at least one of subcarriers of predetermined positions, and pilot symbols are allocated to remaining subcarriers.

14. An apparatus for receiving uplink acknowledge (ACK) information in a communication system using an orthogonal frequency division multiple access (OFDMA) scheme, the apparatus comprising:

a fast Fourier transform (FFT) block for performing FFT on a signal received from a transmitter and outputting modulation symbols allocated to predetermined subcarrier clusters;

a non-coherent demodulator for calculating a soft decision value corresponding to a codeword using the modulation symbols; and a channel decoder for channel-decoding the soft decision value, and determining uplink ACK information corresponding to the codeword, wherein the modulation symbols are defined by an ACK vector index as follows:

|         | ACK vector index |        |        |
|---------|--------|--------|--------|
| ACK bit | Tile 0 | Tile 1 | Tile 2 |
| 0       | 0      | 0      | 0      |
| 1       | 4      | 7      | 2      | the ACK bit indicates the uplink ACK information, each of the ACK vector indexes indicates a predetermined set of transmission symbols, and each of the tiles includes a predetermined number of subcarriers.

15. The apparatus of claim 14, wherein each of the ACK vector indexes corresponds to modulation symbols as defined by the following table:

| ACK vector index | Subcarrier Modulation per Codeword Subcarrier 0, Subcarrier 1, . . . , Subcarrier 7 |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 | where P0, P1, P2, and P3 denote Quadrature Phase Shift Keying (QPSK) modulation symbols respectively.

16. The apparatus of claim 14, wherein, in the subcarrier clusters, the modulation symbols are allocated to at least one of subcarriers of predetermined positions, and pilot symbols are allocated to remaining subcarriers.

* * * * *

UNITED STATES PATENT AND TRADEMARK OFFICE
CERTIFICATE OF CORRECTION

PATENT NO.      : 7,586,834 B2                              Page 1 of 1
APPLICATION NO. : 11/141155
DATED           : September 8, 2009
INVENTOR(S)     : Byun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1092 days.

Signed and Sealed this

Fourteenth Day of December, 2010

David J. Kappos
*Director of the United States Patent and Trademark Office*